US009018791B2

(12) United States Patent
Guo

(10) Patent No.: US 9,018,791 B2
(45) Date of Patent: Apr. 28, 2015

(54) IMPACT TYPE WIND-DRIVEN POWER GENERATING DEVICE

(75) Inventor: Wenli Guo, Beijing (CN)

(73) Assignee: Beijing Hengju Chemical Group Corporation, Beijing (CN)

(*) Notice: Subject to any disclaimer, the term of this patent is extended or adjusted under 35 U.S.C. 154(b) by 0 days.

(21) Appl. No.: 13/977,431

(22) PCT Filed: Jul. 28, 2011

(86) PCT No.: PCT/CN2011/001240
§ 371 (c)(1),
(2), (4) Date: Jul. 26, 2013

(87) PCT Pub. No.: WO2012/088740
PCT Pub. Date: Jul. 5, 2012

(65) Prior Publication Data
US 2013/0328319 A1  Dec. 12, 2013

(30) Foreign Application Priority Data
Dec. 31, 2010 (CN) .......................... 2010 1 0623950

(51) Int. Cl.
F03D 9/00 (2006.01)
F03D 7/02 (2006.01)
(Continued)

(52) U.S. Cl.
CPC .. F03D 7/02 (2013.01); F03D 1/04 (2013.01); F03D 3/04 (2013.01); F05B 2240/131 (2013.01); Y02E 10/72 (2013.01); Y02E 10/74 (2013.01)

(58) Field of Classification Search
CPC .................... F05B 2240/13; F05B 2240/131

USPC .................. 290/44, 55; 415/4.2, 4.4, 102
See application file for complete search history.

(56) References Cited

U.S. PATENT DOCUMENTS 3,720,840 A * 3/1973 Gregg .......................... 290/55
3,883,750 A * 5/1975 Uzzell, Jr. ..................... 290/55
(Continued)

FOREIGN PATENT DOCUMENTS

BR         9002505        1/1991
CN         2165251        5/1994
(Continued)

OTHER PUBLICATIONS

Search Report for International Patent Application No. PCT/CN2011/001240.

Primary Examiner — Tulsidas C Patel
Assistant Examiner — Viet Nguyen
(74) Attorney, Agent, or Firm — Stites & Harbison PLLC; Cong Ding

(57) ABSTRACT

An impact type wind-driven power generating device is classified into a vertical shaft impact type wind-driven power generating device and a horizontal shaft impact type wind-driven power generating device. The two types of the impact type wind-driven power generating device adopt a power rotor mechanism of a multi-stage impacting blade to utilize the energy of in-coming wind to the maximum extent, thereby improving the utilization of the wind energy. The energy of the in-coming wind is increased due to the height difference and the lateral exhaust of a high-altitude exhaust duct, so that the power rotor can generate electric power at a low load even in a sunny windless day. The power generating device overcomes the disadvantages of low utilization of the wind energy and the power rotor being difficult to be activated.

6 Claims, 2 Drawing Sheets

(51) Int. Cl.
*F03D 1/04* (2006.01)
*F03D 3/04* (2006.01)

(56) References Cited

U.S. PATENT DOCUMENTS

| | | | | |
|---|---|---|---|---|
| 4,164,382 | A * | 8/1979 | Mysels | 415/4.4 |
| 4,324,985 | A * | 4/1982 | Oman | 290/55 |
| 4,499,034 | A * | 2/1985 | McAllister, Jr. | 261/109 |
| 5,395,598 | A * | 3/1995 | Prueitt | 422/168 |
| 7,633,177 | B2 * | 12/2009 | Platt | 290/54 |
| 7,685,804 | B2 * | 3/2010 | Evulet | 60/39.5 |
| 2006/0016182 | A1 * | 1/2006 | Comandu et al. | 60/398 |
| 2007/0013196 | A1 * | 1/2007 | Chen | 290/55 |
| 2008/0061559 | A1 * | 3/2008 | Hirshberg | 290/55 |
| 2009/0001724 | A1 * | 1/2009 | Lee et al. | 290/44 |
| 2009/0280008 | A1 | 11/2009 | Brock | |
| 2010/0171314 | A1 * | 7/2010 | Tackett | 290/55 |
| 2010/0219637 | A1 * | 9/2010 | Hovakimian | 290/52 |
| 2011/0033288 | A1 * | 2/2011 | Pezaris | 415/208.1 |
| 2012/0187698 | A1 * | 7/2012 | Bassett | 290/55 |

FOREIGN PATENT DOCUMENTS

| | | |
|---|---|---|
| CN | 2864146 | 1/2007 |
| CN | 101103198 | 1/2008 |
| CN | 102052255 | 3/2012 |
| SU | 1134771 | 1/1985 |

* cited by examiner

IMPACT TYPE WIND-DRIVEN POWER GENERATING DEVICE

CROSS REFERENCE TO RELATED APPLICATION

This application is a §371 National State Application PCT/CN2011/001240, filed Jul. 28, 2011, which claims priority to CN201010623950.1, filed Dec. 31, 2010, the entire disclosures of which are incorporated herein by this reference.

TECHNICAL FIELD

The present invention relates to the technical field of wind power generation, in particular to an impact type wind-driven power generating device.

BACKGROUND ART

The harmonious development among economy, energy and environment is necessary for the modernization of a country. In order to solve the problems of continuous depletion of fossil-fuel energy (oil, coal, etc.) which is non-renewable and does environmental influences, the development of renewable energy sources has been regarded as a specific goal for the future plans in our country and some other developed ones. Wind energy is one of the important, clean, renewable energy sources which would not influence the environment, while the wind power generation is the most quickly developed, technical form which involves scale development and utilization at present. Now the wind power energy has constituted a scale industrial chain.

A wind-driven energy generator basically comprises three units: a primary energy conversion unit, a mechanical energy transfer unit and a generation unit. Wind power is the primary energy of the wind-driven power generation. The primary energy conversion unit mainly functions for the conversion from wind power into rotational mechanical energy (torque). Then the mechanical energy transfer unit and the electric power generation unit connected thereto are driven by means of wind wheels and wind wheel shafts, to constitute an integral, wind-driven power generating device. Thus, the primary energy conversion unit becomes the core part of the wind-driven power generating device.

The primary energy conversion unit comprises wind wheels, power controllers (speed regulators) and other components, wherein the wind wheel is consisted of blades and wheel hubs with good aerodynamic shapes. Currently, the wind-driven power generator set with horizontal shaft usually uses three blades wind wheel. After hundreds of years of research and improvement, such wind wheel can provide certain efficiency, which allows the set operating smoothly, and allows substantially eliminating systematic and cyclic loads, so as to output stable torque. However, it results in that the wind power utilization ratio is actually lower than Betz limit. It is believed by many authorities and units that the wind power utilization ratio provided by such wind wheels is only about 25%. Additionally, in order to maintain the rotational speed at a rated value of the generator, such wind wheel must adopt a speed regulation device having variable propeller pitch or adopt a blade stall control device having fixed propeller pitch with complicated structures, either of which leads to a very high production cost. Another big problem is that the diameter of the wind wheel has to be larger to increase the power for a single set. The diameter for an impeller of a 6 MW wind turbine will exceed 120 meters. Such a large diameter causes great difficulties to the production, transportation, installation and maintenance of blades, and considerably increases the production cost for equipments. Since the diameter of the wind wheel increases, the height of tower rack will be greatly raised, which also causes the same difficulties, and also greatly increases the production cost. Additionally, current wind-driven power generator set with vertical shaft involves more defects. This type of wind-driven power generator set is featured in that the wind wheel rotates around a vertical axis, so as to receive in-coming wind from all directions, without the need to dispose a deviation device towards the wind having complicated structure. Transmission chains and the generator can be installed on the ground so that it is convenient for maintenance. Thus the production cost for the equipments with such structure will be low. However, the most noticeable defect for current wind-driven power generator set with vertical shaft is the low wind power utilization ratio. In order to shorten the transmission shaft, such power generator set is usually installed relatively closer to the ground, thus the available wind power resource is limited, which makes the activation of wind wheels being difficult. With respect to the currently utilized forms of vertical shaft type and horizontal shaft type wind-driven power generator sets, the differences in aerodynamics and structures are relatively large, and the vertical shaft type is far less than the horizontal shaft type in terms of underlying research and technology maturity. Due to the reasons above, although the vertical shaft has many advantages thereof, its development has been limited.

CONTENTS OF THE INVENTION

Technical Problem to be Solved

The first technical problem to be solved by the present invention is to enhance the wind energy utilization ratio for the wind-driven power generating device of vertical shaft type, to reduce the difficulty for starting the wind wheel of the vertical wind-driven power generator set, and to allow the wind-driven power generating device being less affected by the magnitude of wind-force, so as to continuously and steadily generate electricity;

The second technical problem to be solved by the present invention is to enhance the wind energy utilization ratio for the wind-driven power generating device of horizontal shaft type, to reduce the production, transportation, installation and maintenance cost of the wind-driven power generator set of horizontal shaft type, and to allow the wind-driven power generating device being less affected by the magnitude of wind-force, so as to continuously and steadily generate electricity.

Technical Solution

In order to solve the first technical problem above, the present invention proposes an impact type wind-driven power generating device, which comprises:

a wind turbine, a central shaft of the wind turbine is vertically disposed;

an exhaust duct that is disposed coaxially with the wind turbine, the lower end of the exhaust duct is connected with an upper shell of the wind turbine, an exhaust outlet on the upper end of the exhaust duct is disposed at a horizontal direction;

a power rotor that is disposed coaxially with the wind turbine and is located at the bottom of the wind turbine;

blades that are disposed inside the wind turbine and are installed at the periphery of the central shaft of the wind turbine;

an exhaust-air collection chamber that is coaxial with the wind turbine, the exhaust-air collection chamber is formed by a surrounding arrangement of the blades and is connected with the exhaust duct;

a transmission shaft that is disposed coaxially with the wind turbine, the upper end of the transmission shaft is connected to a central shaft of the power rotor, and the lower end of the transmission shaft is connected to a power generating device.

In the above impact type wind-driven power generating device, an air inlet is disposed on a lateral wall of the wind turbine, and a wind collector is disposed at the air inlet; the wind collector includes a wind channel tapered from the air inlet towards the central shaft of the wind turbine; the wind channel therein is provided with several guiding ribbed-plates arranged at intervals in the longitudinal direction, for combing the airflow entering into the wind turbine.

In the above impact type wind-driven power generating device, an airflow accelerating nozzle is disposed at the tail end of the wind channel, the airflow accelerating nozzle is close to the blades in order to filter dust and rainwater carried by in-coming wind and to accelerate the in-coming wind; the airflow accelerating nozzle is rotatably connected to the upper shell of the wind turbine by means of a revolving shaft, the revolving shaft is provided with an adjusting gear assembly thereon, which drives the airflow accelerating nozzle to rotate around the revolving shaft, so as to control air supply rate from the airflow accelerating nozzle into the wind turbine.

In the above impact type wind-driven power generating device, the blades include multi-staged impacting blades and airflow-guiding blades, being alternately disposed; the impacting blades are installed on the power rotor, and the airflow-guiding blades are installed on the upper shell of the wind turbine.

In the above impact type wind-driven power generating device, an air-exhaust diversion device is disposed at the bottom of the exhaust-air collection chamber, for exporting the airflow vertically upward, along the central axis of the air exhaust collection chamber.

In the above impact type wind-driven power generating device, a deviation system is disposed at the connection between the exhaust duct and the wind turbine, for adjusting the exhaust duct, to make its exhaust outlet facing away from the in-coming direction of the wind.

In the above impact type wind-driven power generating device, the transmission shaft is provided with a load-thrust bearing which is supported on a supporting tower; a stator is installed on top of the supporting tower; a ball-aligning bearing is disposed between the stator and the power rotor, so as to limit the rotation of the power rotor inside the stator.

In the above impact type wind-driven power generating device, the power generating device is a horizontal type power generator set or a vertical type power generator set, including successively connected gear box, braking device and power generator; when the power generating device is a horizontal type power generator set, the gear box, braking device and power generator are horizontally disposed, and the central shaft of the gear box is connected with the lower end of the transmission shaft by means of bevel-gear steering-transmission system; when the power generating device is a vertical type power generator set, the gear box, braking device and power generator are vertically disposed, and the central shaft of the gear box is connected with the lower end of the transmission shaft.

In order to solve the second technical problem above, the present invention further proposes an impact type wind-driven power generating device, which comprises:

a wind turbine, a central shaft of the wind turbine is horizontally disposed, and an air inlet of the wind turbine is laterally disposed; wherein, along a direction of the central shaft of the wind turbine, the direction of the in-coming wind is defined as the front, and the opposite direction is defined as the back;

an exhaust duct, the central axis of the exhaust duct is vertical to the central shaft of the wind turbine; the lower end of the exhaust duct is connected with the upper shell of the wind turbine; an exhaust outlet on the upper end of the exhaust duct is horizontally disposed and is opposite to the direction of the air inlet of the wind turbine;

a power rotor that is disposed coaxially with the wind turbine inside the wind turbine;

blades that are disposed inside the wind turbine and are installed at the periphery of the power rotor;

an exhaust-air collection chamber that is disposed coaxially with the wind turbine and is located at the back of the power rotor and of the blades; the exhaust-air collection chamber is formed by a surrounding arrangement of the power rotor, the blades and a back shell of the wind turbine; the upper portion of the exhaust-air collection chamber is connected with the exhaust duct;

a transmission shaft that is successively passing through the power rotor and the exhaust-air collection chamber and is connecting with the power generating device.

In the above impact type wind-driven power generating device, the front portion of the wind turbine is provided with an air inlet, and a wind collector is disposed at the air inlet; the wind collector includes a wind channel tapered from the air inlet towards the back of the wind turbine; the wind channel therein is provided with several guiding ribbed-plates arranged at intervals; the several guiding ribbed-plates are radially disposed, from the central axis of the wind channel towards all around, for combing airflow entering into the wind turbine.

In the above impact type wind-driven power generating device, the back of the wind channel is provided with an airflow accelerating nozzle which is close to the blades, in order to filter sand, dust and rainwater carried by the in-coming wind and to accelerate the in-coming wind; the airflow accelerating nozzle is pivotally connected to the upper shell and to the lower shell of the wind turbine by means of a revolving shaft; the revolving shaft is provided with an adjusting gear assembly thereon, which drives the airflow accelerating nozzle to rotate around the revolving shaft, so as to control air supply rate from the airflow accelerating nozzle into the wind turbine.

In the above impact type wind-driven power generating device, the blades include multi-staged impacting blades and airflow-guiding blades being alternately disposed; the impacting blades are installed on the power rotor, and the airflow-guiding blades are installed on the upper shell and the lower shell of the wind turbine.

In the above impact type wind-driven power generating device, an air-intake diversion device is disposed at the air inlet of the wind turbine, for importing the airflow into the wind turbine; the air-intake diversion device is disposed inside the wind channel, and the guiding ribbed-plates are installed on the side wall of the air-intake diversion device.

In the above impact type wind-driven power generating device, the front end of the transmission shaft is provided with a rolling bearing which is installed inside a fixed shell; the back portion of the transmission shaft is provided with a rolling bearing which is installed inside the back shell of the wind turbine; the back shell of the wind turbine is arranged to raise forward, at a position near the transmission shaft, and has a concaved arc shape at a position near the upper shell and a position near the lower shell of the wind turbine, respectively, for exporting the airflow discharged by the blades into the exhaust-air collection chamber.

In the above impact type wind-driven power generating device, the power generating device is disposed inside an aerial engine-room; the power generating device is a horizontal type power generator set, including successively connected gear box, braking device and power generator; the central shaft of the gear box is connected with the back end of the transmission shaft.

The above impact type wind-driven power generating device further comprises a supporting tower, on which a set chassis is disposed; the wind turbine and the aerial engine room are installed on the set chassis; a deviation system is disposed on the supporting tower, for adjusting rotation of the set chassis, to make the air inlet of the wind turbine facing the direction of the in-coming wind.

Beneficial Effects

The impact type wind-driven power generating devices with vertical shaft and horizontal shaft provided by the above technical solutions adopt a power rotor mechanism having multi-staged impacting blades to utilize the energy of in-coming wind to the maximum extent, thereby improving the utilization ratio of the wind energy. The energy obtained from the in-coming wind is increased due to the height difference and the lateral air exhaust of an exhaust duct located at higher place, so that the power rotor can generate electric power at a low load, even in a sunny, windless day. The power generating devices can be manufactured integrally into a power generator set with larger power and smaller volume per unit, for convenience of transportation, installation and maintenance, thereby greatly reducing the investment cost of the power generating device for unit capacity. The power generating device of vertical shaft type can receive in-coming wind from all directions without the need of a complicated system having variable propeller pitch. The transmission system and the power generator may be placed on the ground, which is convenient for operation and maintenance. The power generating device overcomes the disadvantages of low utilization of the wind energy and the power rotor being difficult to be started; the nozzle that is simple, convenient, safe and reliable can adjust air supply rate, control power output of the wind-driven power generator set under high wind speed, and prevent from destructive over-speed; the device is suitable for wind-driven power generation on land, valley, coast and sea; the blades of the power rotor are sealed inside the shell of the wind collector, thus the noise transmitted to the outside is lowered, such feature is especially prominent when receiving high speed airflow, thus significantly reducing harmful influence to the environment.

Wherein, 1. wind collector; 2. nozzle; 3. adjusting gear assembling; 4. first-staged impacting blades; 5. first-staged airflow-guiding blades; 6. second-staged impacting blades; 7. air-exhaust diversion device; 7-1. air-intake diversion device; 8. exhaust duct; 9. deviation system; 10. power rotor; 11. ball-aligning bearing; 12. transmission shaft; 13. load-thrust bearing; 14. supporting tower; 15. stator; 16. exhaust-air collection chamber; 17. guiding ribbed-plate; 18. supporting ribbed-plate; 19. bevel-gear steering-transmission system; 20. power generator; 21. braking device; 22. gear box; 23. main frame; 24. storage battery room; 25. frequency modulation room; 26. transformer room; 27. ground operation room; 28. upper shell; 29. lower shell; 30. back air-exhaust diversion device; 31. rolling bearing; 32. aerial engine-room; 33. set chassis.

SPECIFIC MODES FOR CARRYING OUT THE INVENTION

Hereinafter the embodiments of the present application will be further described in details, in conjunction with drawings and examples. The following examples are illustrated for explaining the present invention but not for limiting the scope thereof.

Figure 1:
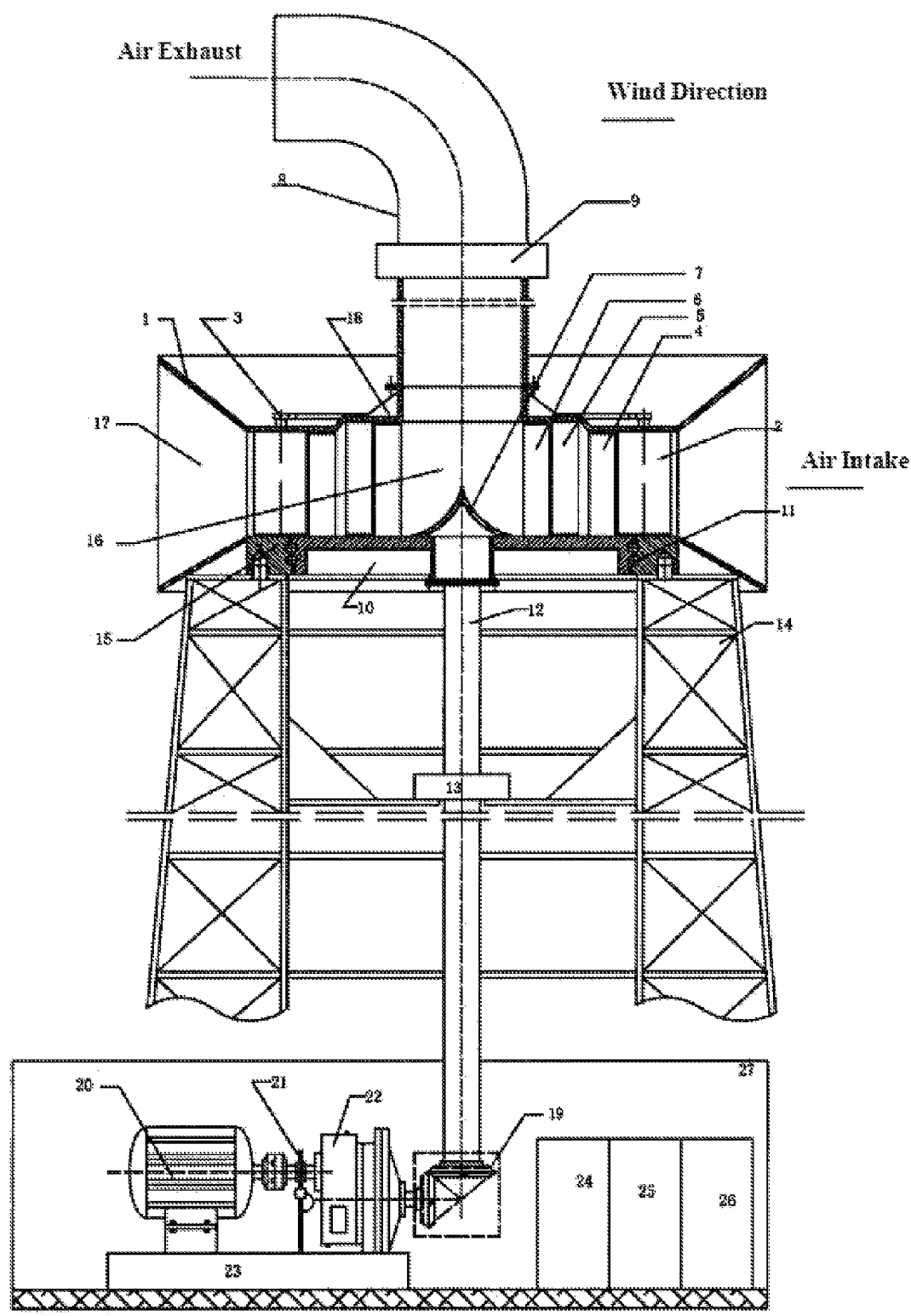
FIG. 1 is a structural schematic diagram of an impact type wind-driven power generating device with vertical shaft according to an embodiment of the present invention.

FIG. 1 shows a structural schematic diagram of an impact type wind-driven power generating device with vertical shaft according to an embodiment of the present invention. As shown in the figure, the device includes wind turbine, exhaust duct 8, power rotor 10, transmission shaft 12, supporting tower 14 and power generating device.

The central shaft of the wind turbine is vertically disposed; the exhaust duct 8 is disposed coaxially with the wind turbine; the lower end of the exhaust duct 8 is connected with an upper shell of the wind turbine, and the exhaust duct 8 is used for exhausting the wind out of the wind turbine; the power rotor 10 is disposed coaxially with the wind turbine and is located at the bottom of the wind turbine, for converting wind energy into mechanical energy; the transmission shaft 12 is disposed coaxially with the wind turbine; the upper end of the transmission shaft 12 is connected to a central shaft of the power rotor 10, and the lower end of the transmission shaft 10 is connected to a power generating device; the transmission shaft 12 is used for transmitting energy produced by the wind turbine to the power generating device to generate electric power; the power generating device is disposed inside the ground operation room 27 for electric power generation, storage and supply; the whole wind turbine and the transmission shaft 12 are both supported by the supporting tower 14, to ensure that the wind turbine is located at a spatial position suitable for wind-driven power generation.

Particularly, an exhaust outlet on the upper end of exhaust duct 8 is disposed in the horizontal direction, that is, the exhaust outlet of exhaust duct 8 is laterally disposed; the deviation system 9 is disposed at the connection between exhaust duct 8 and the wind turbine, and the exhaust outlet of the exhaust duct 8 that exhausts wind laterally always is facing away from the direction of the in-coming wind, under the action of the deviation system 9. In addition, the exhaust duct 8 functions in two special ways, because it has a certain height which leads to a certain, slight difference in temperature between airflow at the air inlet of the wind turbine and airflow at the exhaust outlet of the exhaust duct 8. Based on the airflow aerothermodynamics theory due to temperature difference, a hot airflow with low-altitude will flow to the cold airflow with high-altitude at the exhaust outlet, which increases the energy of in-coming wind. Besides, the exhaust outlet is facing away from the in-coming wind direction, thus the flow rate of the upper wind is relatively high according to the aerothermodynamics theory; when the upper wind passes through the exhaust outlet, a slightly-low pressure area emerges at the exhaust outlet, which will pump the in-coming wind entering into the wind turbine, this in turn increases the energy of the in-coming wind. Therefore, the exhaust duct 8 in the present invention is designed such that the power rotor 10 can be driven to rotate, so as to drive the power generating device to generate electricity, even if it's a sunny, windless day, as long as the power rotor 10 is reasonably designed.

In the present embodiment, the supporting rib plate 18 is disposed at the connection between the exhaust duct 8 and the upper shell of the wind turbine, on the upper shell of the wind turbine, in order to strengthen the fastness of the upper shell on the wind turbine.

The blades are disposed at the periphery of the central shaft of the wind turbine, inside the wind turbine. The blades include multi-staged impacting blades and airflow-guiding blades being alternately disposed, wherein the impacting blades are installed on the power rotor 10, and the airflow-guiding blades are installed on the upper shell of the wind turbine; an air inlet is disposed on a lateral wall of the wind turbine, and a wind collector 1 is disposed at the air inlet; the wind collector 1 includes a wind channel tapered from the air inlet towards the central shaft of the wind turbine; inside the wind channel, several guiding ribbed-plates 17 are disposed at intervals in longitudinal direction, these guiding ribbed-plates 17 divide the wind channel into several sub-wind channels, so that the whirlwind or vortex can be combed before entering into the wind turbine, to make the airflow entering into the wind turbine stable and smooth; besides, the guiding ribbed-plate 17 is connected with the upper shell and the lower shell of the wind turbine, for enhancing the fastness between the upper shell and the lower shell of the wind turbine. Airflow accelerating nozzle 2 is disposed at the tail end of the wind channel, close to the blades, in order to filter sand, dust and rainwater carried by the in-coming wind and to accelerate the in-coming wind; such airflow accelerating nozzle 2 is rotatably connected to the upper shell of the wind turbine by means of a revolving shaft, the revolving shaft is provided with adjusting gear assembly 3 which drives the airflow accelerating nozzle 2 to rotate around the revolving shaft, so as to control air supply rate from the airflow accelerating nozzle 2 into the wind turbine. Since the in-coming wind is varying in strength, in order to prevent the rotational speed of the power rotor 10 from destructive over-speed, the adjusting gear assembly 3 drives the airflow accelerating nozzle 2 to rotate within a range of 90° to change the inlet air area of the wind turbine, that is, to adjust the air supply rate, thereby adjusting the rotational speed of the power rotor 10, thus avoiding the over-speed of the power rotor 10, which can keep the rotational speed of the power rotor 10 being stable to some extent. The exhaust collection chamber 16, disposed coaxially with the wind turbine, is formed by a surrounding arrangement of the blades inside the wind turbine; the top of the exhaust-air collection chamber 16 is communicated with the exhaust duct 8; the air-exhaust diversion device 7 is disposed at the bottom of the exhaust-air collection chamber 16, for exporting the airflow discharged by the blades, vertically upward, along the central axis of the exhaust-air collection chamber 16, to prevent the airflow discharged by the blades from mutually impacting which makes it difficult to exhaust the airflow from the wind turbine.

The transmission shaft 12 is provided with a load-thrust bearing 13, which is supported on the supporting tower 14; on the supporting tower 14, a stator 15 is installed, and a ball-aligning bearing 11 is disposed between the power rotor 10 and the stator 15, so as to restrict the power rotor 10 inside the stator 15 for rotation. In this way, both of the weight of the power rotor 10 and the additional vertical force generated during the rotation of the power rotor 10 are acting on the load-thrust bearing 13, that is, the load-thrust bearing 13 bears the total downward vertical force of power rotor 10.

The power generating device is a horizontal type power generator set or a vertical type power generator set, both are disposed in the ground operation room 27, including successively connected gear box 22, braking device 21 and power generator 20; when the power generating device is a horizontal type power generator set, the gear box 22, braking device 21 and power generator 20 are horizontally disposed, and the central shaft of the gear box 22 is connected with the lower end of the transmission shaft 12 by means of the bevel-gear steering-transmission system 19; when the power generating device is a vertical type power generator set, the gear box 22, braking device 21 and power generator 20 are vertically disposed, and the central shaft of the gear box 22 is connected with the lower end of the transmission shaft 12. The gear box 22, braking device 21 and power generator 20 are all fixedly installed on the main frame 23; the storage battery room 24, frequency modulation room 25 and transformer room 26 are further disposed in the ground operation room 27, so as to be convenient for subsequent, substation power supply after power generation.

In the following, the power generating process of such impact type wind-driven power generating device with vertical shaft will be described in combination with FIG. 1. Such power generating device can receive in-coming wind from all directions. After the airflow enters into the wind collector 1, it is combed and accelerated in the tapered wind channel. When the accelerated airflow passes through the airflow accelerating nozzle 2, the sand, dust and rainwater carried by the in-coming wind can be removed by a special structure of such nozzle 2, and the relatively clean, in-coming wind is accelerated to its maximum value at the outlet of nozzle 2 for the second time. The accelerated airflow impacts on the first-staged impacting blades 4, which give a torque to the power rotor 10. Based on the airflow aerothermodynamics theory, the torque generates a certain amount of pressure on the inner, concaved arc surface of the first-staged impacting blade 4, whereas generates a low pressure area on the back arc surface of the first-staged impacting blade 4, with the pressure being lower than that of the inner, concaved arc surface (even forming a negative pressure area). Under such pressure difference between the inner and outer arc surfaces, the first-staged impacting blades 4 are given a strong thrust; the airflow flowing out of the first-staged impacting blades 4 has a certain amount of energy, the direction of such airflow is modulated by the first-staged airflow-guiding blades 5 and accelerated to impact on the second-staged impacting blades 6, which also give a torque to the power rotor 10. According to the condition of wind power resources at the installation place for a wind-driven power generating device, the guiding blades and impacting blades of third stage, forth stage and so on can be disposed so that the airflow can be utilized for multiple times; then the airflow enters into the exhaust-air collection chamber 16, passes into the exhaust duct 8 along the exhaust-air collection chamber 16 under the function of the air-exhaust diversion device 7, and is finally discharged; meanwhile, impacting blades of respective stages give a torque to the power rotor 10, which transmits this kinetic energy to a power generating device by means of the transmission shaft 12, for electric power generation, storage and supply.

Figure 2:
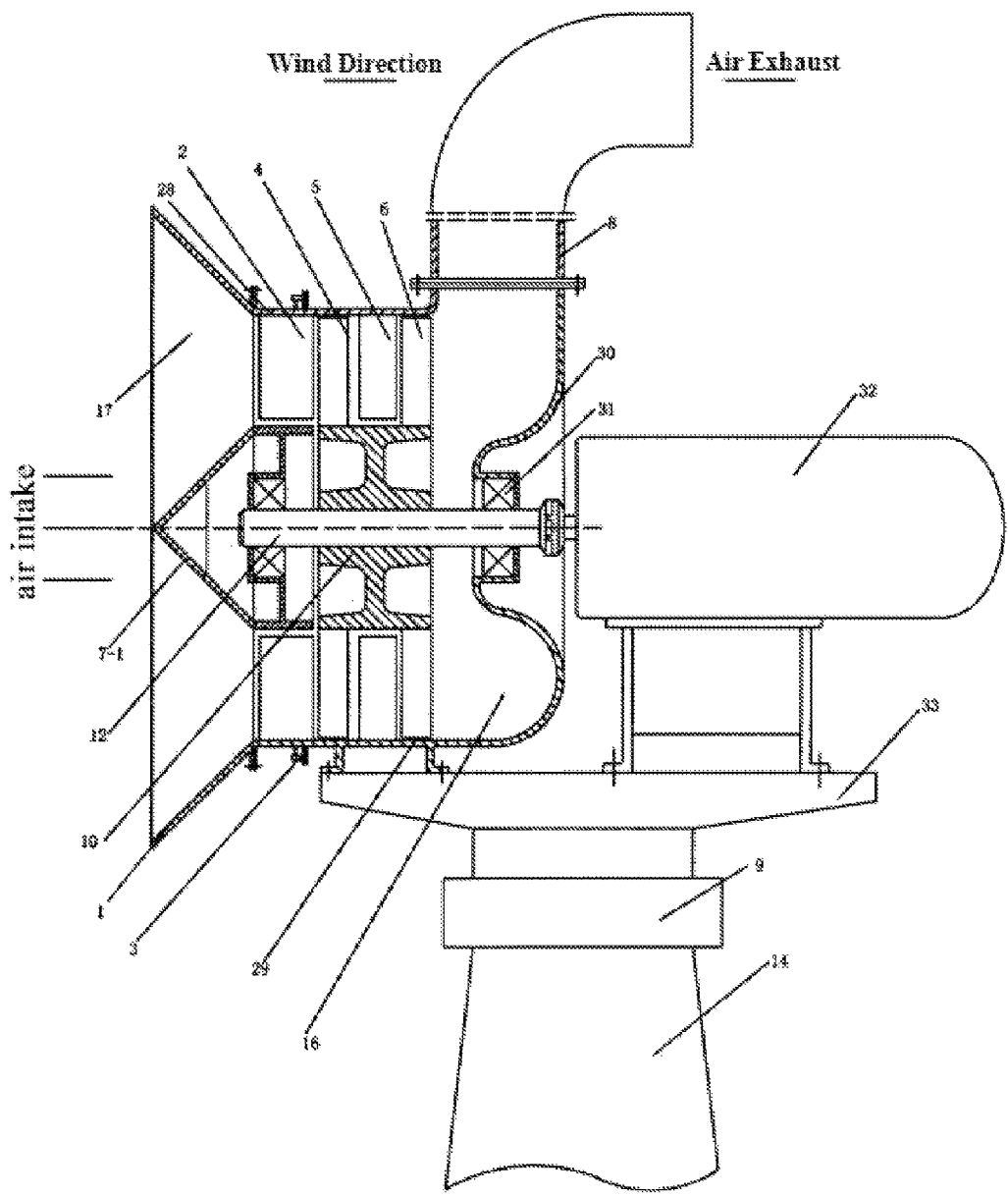
FIG. 2 is a structural schematic diagram of an impact type wind-driven power generating device with horizontal shaft according to an embodiment of the present invention.

FIG. 2 shows a structural schematic diagram of an impact type wind-driven power generating device with horizontal shaft according to an embodiment of the present invention. As shown in the figure, the device includes wind turbine, exhaust duct 8, power rotor 10, transmission shaft 12, supporting tower 14 and power generating device.

The central shaft of the wind turbine is horizontally disposed, and an air inlet of the wind turbine is laterally disposed; wherein, in order to be convenient for subsequent description, along the central shaft direction of the wind turbine, the direction of the in-coming wind is defined as the front, and the opposite direction is defined as the back; the central axis of the exhaust duct 8 is disposed vertically to the central shaft of the wind turbine, and the lower end of the exhaust duct 8 is connected with the upper shell of the wind turbine; the exhaust duct 8 is used for exhausting the wind out of the wind turbine; the power rotor 10 is disposed coaxially with the wind turbine inside the wind turbine, for converting wind energy into mechanical energy; the transmission shaft 12 is disposed coaxially with the wind turbine; the front end portion of the transmission shaft 12 acts as the main shaft of the wind turbine, and the back end of the transmission shaft 12 is connected to the power generating device; the transmission shaft 12 is used for transmitting energy produced by the wind turbine to the power generating device for generating electric power; the power generating device is disposed inside the aerial engine-room 32, for electric power generation, storage and supply; the whole wind turbine and the aerial engine room 32 are both supported by the supporting tower 14, to ensure that the wind turbine is located at a spatial position suitable for wind-driven power generation.

Particularly, an exhaust outlet on the upper end of the exhaust duct 8 is disposed in the horizontal direction, that is, the exhaust outlet of the exhaust duct 8 is laterally disposed and is opposite to the direction of the air inlet of the wind turbine; blades are disposed at the periphery of the power rotor 10, inside the wind turbine; the blades include multi-staged impacting blades and airflow-guiding blades being alternately disposed, wherein the impacting blades are installed on the power rotor 10, and the airflow-guiding blades are respectively installed on the upper shell 28 and the lower shell 29 of the wind turbine; an air inlet is disposed on a lateral wall of the wind turbine, and a wind collector 1 is disposed at the air inlet; the wind collector 1 includes a wind channel tapered from the air inlet towards the back portion of the wind turbine; the wind channel is provided with several guiding ribbed-plates 17 which are radially disposed, from the central axis of the wind channel towards all around, for combing airflow entering into the wind turbine; an air-intake diversion device 7-1 is disposed at the air inlet of the wind turbine and is located inside the wind channel, so that several guiding ribbed-plates 17 are respectively installed between the upper shell 28, lower shell 29 of the wind turbine and the air-intake diversion device 7-1; the air-intake diversion device 7-1 is used for importing the in-coming wind airflow into the wind turbine.

The airflow accelerating nozzle 2 is disposed at the tail end of the wind channel and is close to the blades, in order to filter sand, dust and rainwater carried by the in-coming wind and to accelerate the in-coming wind; the airflow accelerating nozzle 2 is respectively connected to the upper shell 28 and lower shell 29 of the wind turbine by means of a revolving shaft which is provided with adjusting gear bearing 3; the adjusting gear bearing 3 drives the airflow accelerating nozzle 2 to rotate around the revolving shaft, so as to control the air supply rate from the airflow accelerating nozzle 2 into the wind turbine. Since the in-coming wind is varying in strength, in order to prevent the rotational speed of the power rotor 10 from destructive over-speed, the adjusting gear bearing 3 drives the airflow accelerating nozzle 2 to rotate within a range of 90° to change the inlet air area of the wind turbine, that is, to adjust the air supply rate, thereby adjusting the rotational speed of the power rotor 10, thus avoiding the over-speed of the power rotor 10, which can keep the rotational speed of the power rotor 10 being stable to some extent. The exhaust-air collection chamber 16 is formed by a surrounding arrangement of the blades, power rotor 10 and the back shell of the wind turbine, and is located at the back of the blades and power rotor 10, at the back portion of the wind turbine; the top of the exhaust-air collection chamber 16 is communicated with the exhaust duct 8; a back air-exhaust diversion device 30 is disposed at the back shell of the wind turbine, the back air-exhaust diversion device 30 is arranged to be raised forward, at a position near the transmission shaft 12, and has a concaved arc shape at a position near the upper shell 28 and a position near the lower shell 29 of the wind turbine, respectively, so that this back air-exhaust diversion device 30 has a function of guiding airflow, to export the airflow in the exhaust-air collection chamber 16 vertically upward.

The power generating device that is connected with the back end of the transmission shaft 12 is identical with the one in the impact type wind-driven power generating device with vertical shaft in the above embodiment, this power generating device is disposed inside the aerial engine-room 32; the wind turbine and aerial engine-room 32 are both fixedly installed on the set chassis 33, which is used as a supporting device and is installed on the supporting tower 14, wherein a deviation system 9 is disposed at the connection between the supporting tower 14 and the set chassis 33, the deviation system 9 is used for adjusting the set chassis 33, so that the wind turbine and the aerial engine-room 32 can rotate correspondingly, which allows the air inlet of the wind collector always being aligning with the direction of the in-coming wind, so as to sufficiently receive the energy of in-coming wind; the power generating device is disposed inside aerial engine room 32 to coordinate with the central shaft of the wind turbine which is arranged horizontally, so as to be convenient for transmitting mechanical energy produced by the wind turbine to the power generating device, for generating power.

In the following, the power generating process of such impact type wind-driven power generating device with vertical shaft will be described in combination with FIG. 2. Such power generating device is adjusted by the deviation system 9 to receive in-coming wind from all directions. When the air inlet of the wind turbine is facing the direction of the in-coming wind, the airflow of the in-coming wind is combed by the guiding ribbed-plate 17 of the wind collector 1; after being imported into the wind collector 1 by air-intake diversion device 7-1, the airflow is accelerated in the tapered wind channel. When the accelerated airflow passes through the airflow accelerating nozzle 2, the sand, dust and rainwater carried by the in-coming wind can be removed by a special structure of such airflow accelerating nozzle 2, and the relatively clean in-coming wind is accelerated to its maximum value at the outlet of the airflow accelerating nozzle 2 for the second time. The accelerated airflow impacts on the first-staged impacting blades 4 which give a torque to the power rotor 10. Based on the aerothermodynamics theory, the torque generates a certain amount of pressure on the inner, concaved arc surface of the first-staged impacting blades 4, whereas generates a low pressure area on the back arc surface of the first-staged impacting blades 4, with the pressure being lower than that of the concaved arc surface (even forming a negative pressure area). Under such pressure difference between inner and outer arc-surfaces, the first-staged impacting blades 4 are given a strong thrust; the airflow flowing out of the first-staged impacting blades 4 has a certain amount of energy, the direction of such airflow is modulated by the first-staged airflow-guiding blades 5 and accelerated to impact on the second-staged impacting blades 6, which also give a torque to the power rotor 10. According to the condition of wind power resources at the installation place for a wind-driven power generating device, the guiding blades and impacting blades of third stage, forth stage and so on can be disposed so that the airflow can be utilized for multiple times; then the airflow discharged by the blades enters into the exhaust-air collection chamber 16, passes into the exhaust duct 8 along the exhaust-air collection chamber 16 under the function of the back air-exhaust diversion device 30, and is finally discharged; meanwhile, the impacting blades of respective stages give a torque to the power rotor 10, which transmits such kinetic energy to a power generating device by means of the transmission shaft 12, for electric power generation, storage and supply.

INDUSTRIAL APPLICABILITY

It can be seen from the above embodiments that the impact type wind-driven power generating device proposed by the embodiments of the present invention adopts a power rotor mechanism having multi-staged impacting blades to utilize the energy of in-coming wind to the maximum extent, thereby improving the utilization ratio of the wind energy. The energy obtained from the in-coming wind is increased due to the height difference and the lateral exhaust of an exhaust duct located at higher place, so that the power rotor can generate electric power at a low load, even in a sunny windless day. The power generating device can be manufactured integrally into a power generator set with larger power and smaller volume per unit, for convenience of to transportation, installation and maintenance, thereby greatly reducing the investment cost of power generating device for unit capacity. The power generating device of vertical shaft type can receive in-coming wind from all directions without the need of a complicated system having variable propeller pitch. The transmission system and the power generator may be placed on the ground, which is convenient for operation and maintenance. The power generating device overcomes the disadvantages of low utilization of the wind energy and the power rotor being difficult to be started; the nozzle that is simple, convenient, safe and reliable can adjust air supply rate, control power output of the wind-driven power generator set under high wind speed, and prevent from destructive over-speed; the device is suitable for wind-driven power generation on land, valley, coast and sea; the blades of the power rotor are sealed inside the shell of the air collector, thus the noise transmitted to the outside is lowered, such feature is especially prominent when receiving high speed airflow, thus significantly reducing harmful influence to the environment.

What is claimed is:

1. An impact type wind-driven power generating device, comprising:
    a wind turbine, a central shaft of the wind turbine is vertically disposed;
    an exhaust duct that is disposed coaxially with the wind turbine, the lower end of the exhaust duct is communicated with an upper shell of the wind turbine, an exhaust outlet on the upper end of the exhaust duct is disposed in the horizontal direction;
    a power rotor that is disposed coaxially with the wind turbine and is located at the bottom of the wind turbine;
    blades that are disposed inside the wind turbine and are installed at the periphery of the central shaft of the wind turbine;
    an exhaust-air collection chamber that is coaxial with the wind turbine, the exhaust-air collection chamber is formed by a surrounding arrangement of the blades and is communicated with the exhaust duct;
    a transmission shaft that is disposed coaxially with the wind turbine, the upper end of the transmission shaft is connected to a central shaft of the power rotor, and the lower end of the transmission shaft is connected to a power generating device;
    an air inlet is disposed on a lateral wall of the wind turbine;
    a wind collector disposed at the air inlet that includes a wind channel tapered from the air inlet towards the central shaft of the wind turbine;
    guiding ribbed-plates provided on the wind channel and arranged at intervals in a longitudinal direction, the guiding ribbed-plates combing the airflow entering into the wind turbine;
    an airflow accelerating nozzle disposed at the tail end of the wind channel, the airflow accelerating nozzle is close to the blades for filtering sand, dust, and rainwater carried by the in-coming wind and for accelerating the in-coming wind; and
    a revolving shaft, which is provided with an adjusting gear assembly, that rotatably connects the airflow accelerating nozzle to the upper shell of the wind turbine, the adjusting gear assembly can drive the airflow accelerating nozzle to rotate around the revolving shaft so as to control an air supply rate from the airflow accelerating nozzle into the wind turbine.

2. The impact type wind-driven power generating device of claim 1, wherein the blades include multi-staged impacting blades and airflow-guiding blades being alternately disposed; the impacting blades are installed on the power rotor, and the airflow-guiding blades are installed on the upper shell of the wind turbine.

3. The impact type wind-driven power generating device of claim 1, wherein an air-exhaust diversion device is disposed at the bottom of the exhaust-air collection chamber, for exporting the airflow vertically upward, along the central axis of the exhaust-air collection chamber.

4. The impact type wind-driven power generating device of claim 1, wherein a deviation system is disposed at the connection between the exhaust duct and the wind turbine, for adjusting the exhaust duct to make the exhaust outlet facing away from the direction of the in-coming wind.

5. The impact type wind-driven power generating device of claim 1, wherein the transmission shaft is provided with a load-thrust bearing which is supported on a supporting tower, the supporting tower is installed with a stator on the top, and an aligning rolling bearing is disposed between the stator and the power rotor, so as to restrict the power rotor inside the stator for rotation.

6. The impact type wind-driven power generating device of claim 1, wherein the power generating device is a horizontal type power generator set or a vertical type power generator set, including successively connected gear box, braking device and power generator; when the power generating device is a horizontal type power generator set, the gear box, braking device and power generator are horizontally disposed, and the central shaft of the gear box is connected with the lower end of the transmission shaft by means of bevel-gear steering-transmission system; when the power generating device is a vertical type power generator set, the gear box, braking device and power generator are vertically disposed, and the central shaft of the gear box is connected with the lower end of the transmission shaft.

* * * * *